UNITED STATES PATENT OFFICE.

KONSTANCE E. NELDNER, OF MILWAUKEE, WISCONSIN, ASSIGNOR OF ONE-HALF TO VINCENT K. NELDNER, OF MILWAUKEE, WISCONSIN.

CHEESE.

1,092,504.         Specification of Letters Patent.     Patented Apr. 7, 1914.

No Drawing.     Application filed November 26, 1913. Serial No. 803,105.

*To all whom it may concern:*

Be it known that I, KONSTANCE E. NELDNER, a citizen of the United States, and resident of Milwaukee, in the county of Milwaukee and State of Wisconsin, have invented certain new and useful Improvements in Cheese; and I do hereby declare that the following is a full, clear, and exact description thereof.

My invention consists in a novel cheese and the process of making the same, as is hereinafter fully described and claimed, its object being to provide a rich, palatable, readily digestible and nutritious food product.

The finished cheese is a cooked mixture of ripened and salted crumbly sour milk curd and sweet cream, the process of manufacture being as follows: Any suitable quantity of sour milk is strained to separate its curd from the whey, the separation being continued under pressure until the curd can be crumbled into small particles. The curd is then kept in a temperature of from 80° to 100° Fahrenheit for from thirty-five to forty hours or until it ripens to the color of cream, said curd being stirred at intervals of from three to four hours. When the desired color of the curd is obtained, the mass is salted and mixed with sweet cream that approximately equals in volume the amount of whey separated from the curd. The mixture is then cooked in a suitable receptacle exposed to boiling water for from sixty to seventy-five minutes, said mixture being constantly agitated during the cooking operation, after which it is cooled in suitable forms, the product being then ready for consumption. If a softer cheese is desired, more cream is employed and the cooking, as aforesaid, completed in from fifty to sixty minutes, after which the product is poured into glass jars or other suitable receptacles from which it is consumed, its consistency being about that of butter for spreading on bread or crackers.

It is to be noted that there is no kneading of the crumbly mass of curd aforesaid, and that said curd is not allowed to ferment or ripen beyond the time it will assume a cream color, this result being obtained within from thirty-five to forty hours in a temperature of from 80° to 100° Fahrenheit, during which time it is occasionally stirred, and having sufficiently ripened it is salted, creamed, cooked and cooled ready for consumption, the whole process after the separation of the curd from the whey being completed within less than two days.

I claim:

1. A cheese consisting of a cooked mixture of sweet cream and a mass of salted crumbly sour milk curd ripened to a cream color, the proportion of cream being approximately equal in volume to the amount of whey separated from the curd.

2. A cheese-making process that consists in separating sour milk curd from whey under pressure until the curd is crumbly, exposing the crumbly mass of curd to a temperature of from 80° to 100° Fahrenheit for from thirty five to forty hours and stirring the same at intervals of from three to four hours, salting the mass, mixing the salted mass with sweet cream that approximately equals in volume the amount of whey separated from the curd, cooking the mixture in a suitable receptacle exposed to boiling water from fifty to seventy-five minutes, and finally cooling the products in suitable forms.

In testimony that I claim the foregoing I have hereunto set my hand at Milwaukee in the county of Milwaukee and State of Wisconsin in the presence of two witnesses.

KONSTANCE E. NELDNER.

Witnesses:
  LOUIS A. FONS,
  M. A. CHYBOWSKI.